(12) United States Patent
Radhakrishnan (10) Patent No.: US 9,229,778 B2
(45) Date of Patent: Jan. 5, 2016

(54) METHOD AND SYSTEM FOR DYNAMIC SCALING IN A CLOUD ENVIRONMENT

(75) Inventor: Ganesan Radhakrishnan, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 140 days.

(21) Appl. No.: 13/456,402

(22) Filed: Apr. 26, 2012

(65) Prior Publication Data

US 2013/0290499 A1 Oct. 31, 2013

(51) Int. Cl.
*G06F 15/173* (2006.01)
*G06F 9/50* (2006.01)
*H04L 29/14* (2006.01)

(52) U.S. Cl.
CPC .......... *G06F 9/505* (2013.01); *G06F 2209/508* (2013.01); *G06F 2209/5022* (2013.01); *H04L 69/40* (2013.01)

(58) Field of Classification Search
CPC .............. G06F 9/505; G06F 2209/508; G06F 2209/5022; H04L 69/40
USPC ........................... 709/226, 224, 238; 718/104
See application file for complete search history.

(56) References Cited

U.S. PATENT DOCUMENTS

| | | | | |
|---|---|---|---|---|
| 5,768,535 | A * | 6/1998 | Chaddha et al. | 709/247 |
| 6,763,520 | B1 * | 7/2004 | Seeds | 718/101 |
| 6,822,595 | B1 * | 11/2004 | Robinson | 341/144 |
| 6,888,552 | B2 * | 5/2005 | Debevec et al. | 345/589 |
| 6,983,324 | B1 * | 1/2006 | Block et al. | 709/228 |
| 7,080,378 | B1 * | 7/2006 | Noland et al. | 718/104 |
| 7,486,299 | B2 * | 2/2009 | Debevec et al. | 345/589 |
| 7,734,676 | B2 * | 6/2010 | Dritschler et al. | 709/200 |
| 7,886,021 | B2 * | 2/2011 | Scheifler et al. | 709/217 |
| 7,978,202 | B2 * | 7/2011 | Debevec et al. | 345/589 |
| 8,084,986 | B2 * | 12/2011 | Cheng et al. | 318/808 |
| 8,296,434 | B1 * | 10/2012 | Miller et al. | 709/226 |
| 8,310,950 | B2 * | 11/2012 | Lofstrand et al. | 370/252 |
| 8,380,880 | B2 * | 2/2013 | Gulley et al. | 709/248 |
| 8,499,148 | B2 * | 7/2013 | Eng et al. | 713/155 |
| 2002/0052909 | A1 * | 5/2002 | Seeds | 709/104 |
| 2002/0186224 | A1 * | 12/2002 | Debevec et al. | 345/589 |
| 2003/0005028 | A1 * | 1/2003 | Dritschler et al. | 709/104 |
| 2004/0064738 | A1 * | 4/2004 | Kanno et al. | 713/201 |
| 2005/0256971 | A1 * | 11/2005 | Colrain et al. | 709/238 |
| 2005/0262183 | A1 * | 11/2005 | Colrain et al. | 709/200 |
| 2006/0007502 | A1 * | 1/2006 | Debevec et al. | 358/452 |

(Continued)

*Primary Examiner* — Viet Vu
*Assistant Examiner* — Michael A Chambers
(74) *Attorney, Agent, or Firm* — Kramer & Amado, P.C.

(57) ABSTRACT

Various exemplary embodiments relate to a method and related network node including one or more of the following: determining first server dynamics associated with a first server instance, wherein the first server dynamics are indicative of a current performance of the first server instance; determining second server dynamics associated with a second server instance, wherein the second server dynamics are indicative of a current performance of the second server instance; determining, based on the first server dynamics, a current operating mode of the first server instance; determining, based on the second server dynamics, a current operating mode of the second server instance; scaling up with respect to the first server instance based on the first current operating mode indicating that the server instance is oversaturated; and scaling down with respect to the second server instance based on the second current operating mode indicating that the server instance is undersaturated.

20 Claims, 5 Drawing Sheets

(56) References Cited

U.S. PATENT DOCUMENTS

| | | | |
|---|---|---|---|
| 2009/0271472 A1* | 10/2009 | Scheifler et al. | 709/202 |
| 2009/0303249 A1* | 12/2009 | Debevec et al. | 345/617 |
| 2010/0223385 A1* | 9/2010 | Gulley et al. | 709/226 |
| 2011/0078303 A1* | 3/2011 | Li et al. | 709/224 |
| 2011/0158088 A1* | 6/2011 | Lofstrand et al. | 370/229 |
| 2011/0235799 A1* | 9/2011 | Sovio et al. | 380/30 |
| 2011/0238985 A1* | 9/2011 | Sovio et al. | 713/168 |
| 2011/0283203 A1* | 11/2011 | Periyannan et al. | 715/753 |
| 2012/0208592 A1* | 8/2012 | Davis et al. | 455/556.1 |
| 2013/0060933 A1* | 3/2013 | Tung et al. | 709/224 |
| 2013/0076772 A1* | 3/2013 | Debevec et al. | 345/589 |

* cited by examiner

| | 305 | 310 | 315 | 320 | 325 | 330 | 335 | 340 |
|---|---|---|---|---|---|---|---|---|
| | Tr | SID | Tc | y(t) | μ(t) | h(t) | T(t) | ΔT |
| 345 | 1332445416 | S2 | 1332445415 | 350 | 400 | 20 | 120 | 5 |
| 350 | 1332445421 | S1 | 1332445418 | 250 | 100 | 500 | 26000 | 10 |
| 355 | 1332445421 | S2 | 1332445420 | 400 | 450 | 10 | 110 | 5 |
| 360 | ... | ... | ... | ... | ... | ... | ... | ... |

*FIG. 3*

| | 405 | 410 | 415 | 420 | 425 |
|---|---|---|---|---|---|
| | Tr | SID | Tc | $\mu_s(t)$ | $h_s(t)$ |
| 430 | 1332445409 | S1 | 1332445409 | 458.16 | 269.39 |
| 435 | 1332445411 | S2 | 1332445410 | 433.30 | 29.08 |
| 440 | ... | ... | ... | ... | ... |

*FIG. 4*

| | 505 | 510 | 515 | 520 | 525 | 530 | 535 |
|---|---|---|---|---|---|---|---|
| | Styp | α | $\mu_r^l$ | $\mu_r^h$ | $h_r^l$ | $h_r^h$ | SF |
| 540 | 0x1A | 0.2 | 200 | 1000 | 50 | 400 | T |
| 550 | 0x32 | 0.3 | 200 | 600 | 20 | 100 | T |
| 555 | ... | ... | ... | ... | ... | ... | ... |

… 
METHOD AND SYSTEM FOR DYNAMIC SCALING IN A CLOUD ENVIRONMENT

TECHNICAL FIELD

Various exemplary embodiments disclosed herein relate generally to cloud computing.

BACKGROUND

Traditional approaches to application design may be based on various assumptions such as the existence of a pre-determined infrastructure and the ability to exercise control over aspects of the application including hardware, databases, and deployment configurations with other software and applications. In contrast, these assumptions may not be the case in cloud computing. For example, in various cloud applications, the infrastructure may be capable of changing dynamically as an application executes. Further, in some cases, the application designed may not be able to exert as much control over every component associated with an application as well as other applications that may share resources with the application being developed. Faults, errors, and other anomalies originating from one application or infrastructure may adversely impact other unrelated cloud applications which are sharing the impacted resources. As such, it would be desirable to provide a method and system capable of avoiding or reducing such adverse impacts while providing application developers with the flexibility of the cloud.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a scaling controller for providing dynamic scaling, the method including one or more of the following: determining, by the scaling controller, first server dynamics associated with a first server instance, wherein the first server dynamics are indicative of a current performance of the first server instance; determining, by the scaling controller, second server dynamics associated with a second server instance, wherein the second server dynamics are indicative of a current performance of the second server instance; determining, based on the first server dynamics, a current operating mode of the first server instance; determining, based on the second server dynamics, a current operating mode of the second server instance; scaling up with respect to the first server instance based on the first current operating mode indicating that the server instance is oversaturated; and scaling down with respect to the second server instance based on the second current operating mode indicating that the server instance is undersaturated.

Various exemplary embodiments relate to a scaling controller for providing dynamic scaling, the scaling controller including one or more of the following: a blackboard interface configured to communicate with an instantaneous server dynamics blackboard; a cloud controller interface configured to communicate with a cloud controller; an instantaneous dynamics retriever configured to retrieve an instantaneous dynamics value via the blackboard interface; a smoothed dynamics calculator configured to compute a smoothed dynamics value based on the instantaneous dynamics value; a scaling decision engine configured to determine, based on the smoothed dynamics value, whether a server instance associated with the smoothed dynamics value should be scaled up or scaled down; and a scaler configured to transmit a scaling instruction via the cloud controller interface based on the determination of the scaling decision engine.

Various exemplary embodiments relate to an apparatus for providing dynamic scaling, the apparatus comprising: a memory; and a processor communicatively coupled to the memory, the processor being configured to: determine first server dynamics associated with a first server instance, wherein the first server dynamics are indicative of a current performance of the first server instance; determine second server dynamics associated with a second server instance, wherein the second server dynamics are indicative of a current performance of the second server instance; determine, based on the first server dynamics, a current operating mode of the first server instance; determine, based on the second server dynamics, a current operating mode of the second server instance; scale up with respect to the first server instance based on the first current operating mode indicating that the server instance is oversaturated; and scale down with respect to the second server instance based on the second current operating mode indicating that the server instance is undersaturated.

Various exemplary embodiments relate to a non-transitory machine-readable storage medium encoded with instructions for execution by a scaling controller for providing dynamic scaling, the machine-readable storage medium including one or more of the following: instructions for determining, for a server instance by the scaling controller, server dynamics associated with the server instance, wherein the server dynamics are indicative of a current performance of the server instance; instructions for determining, based on the server dynamics, a current operating mode of the server instance; instructions for, if the current operating mode indicates that the server instance is oversaturated, scaling up with respect to the server instance; and instructions for, if the current operating mode indicates that the server instance is undersaturated, scaling down with respect to the server instance.

Various embodiments are described wherein the first server dynamics include at least one value for a service rate and at least one value for an input queue height.

Various embodiments are described wherein, the step of determining first server dynamics includes: receiving instantaneous server dynamics reported by the first server instance, and computing smoothed server dynamics based on the instantaneous server dynamics; and the step of determining, based on the first server dynamics, a current operating mode includes: determining, based on the smoothed server dynamics, a current operating mode of the first server instance.

Various embodiments are described wherein the step of computing smoothed server dynamics includes: retrieving a previous smoothed server dynamics value; multiplying the previous smoothed server dynamics value by a decay factor to produce a decayed server dynamics value; and adding an instantaneous server dynamics value of the instantaneous server dynamics to the decayed server dynamics value to produce a smoothed server dynamics value. Various embodiments may additionally normalize various dynamics values based on a window length which may be determined by the decay factor.

Various embodiments are described wherein the step of determining a current operating mode of the first server instance includes: comparing at least one value of the first server dynamics to at least one threshold value associated with the at least one value; determining, based on the comparison, whether the current operating mode of the server instance is undersaturated, saturated, or oversaturated.

Various embodiments are described wherein the step of scaling up includes sending an instruction to spawn at least one new server instance.

Various embodiments are described wherein the step of scaling down includes sending an instruction to combine at least two server instances into a single server instance.

Various embodiments are described wherein the input queue height is a value derived by normalizing an input queue length based on complexities of requests stored in the input queue. In various embodiments, this normalization may be accomplished by dividing the input queue length by a service rate.

Various embodiments additionally include a database interface configured to communicate with at least one database; a smoothed dynamics retriever configured to retrieve a previous smoothed dynamics value; and a metadata retriever configured to retrieve a decay factor, wherein, in computing the smoothed dynamics value, the smoothed dynamics calculator is configured to compute the smoothed dynamics value based on the instantaneous dynamics value, the previous smoothed dynamics value, and the decay factor.

Various embodiments are described wherein the metadata retriever is further configured to retrieve at least one threshold value, and in determining whether a server instance should be scaled up or scaled down, the scaling decision engine is configured to compare the scaled dynamics value to the at least one threshold value.

Various embodiments are described wherein the metadata retriever is further configured to determine an server type associated with the server instance, and in retrieving the decay factor, the metadata retriever is configured to retrieve a decay factor associated with the server type.

Various embodiments are described wherein the scaling instruction includes at least one of the following: an instruction to redistribute work load among a plurality of server instances; an instruction to request additional resources at least one server instance; an instruction to spawn at least one new server instance; and an instruction to terminate at least one server instance.

Various embodiments additionally include a topology manager interface configured to communicate with a topology manager; and a topology change reporter configured to receive, via the cloud controller interface, an indication of a change in cloud topology, and report the change in cloud topology via the topology manager interface.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Figure 1:
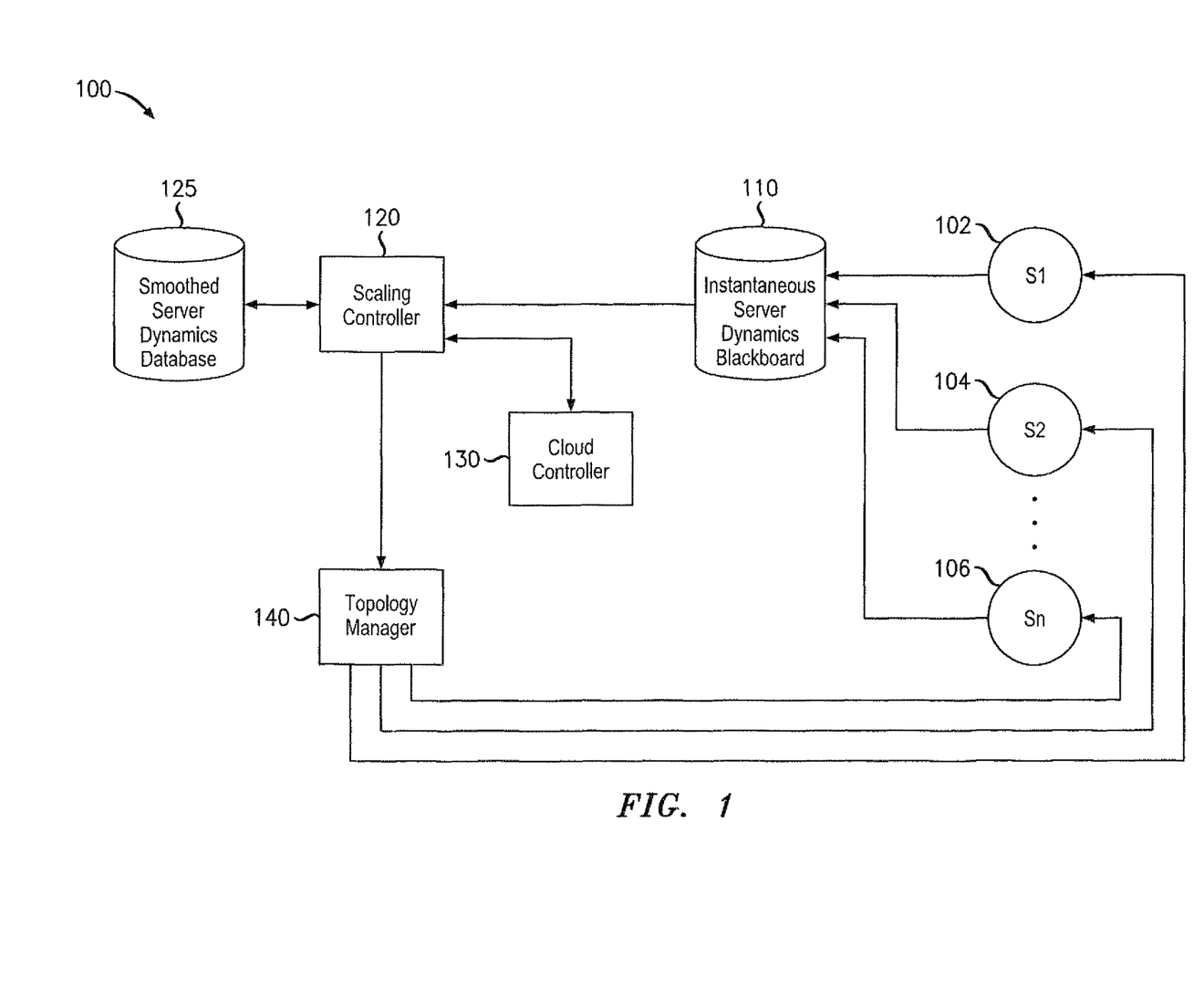
FIG. 1 illustrates an exemplary cloud environment for application execution and dynamic scaling.

FIG. 1 illustrates an exemplary cloud environment 100 for application execution and dynamic scaling. Cloud environment 100 may be an abstraction. For example, various components may be implemented on hardware such as, for example, one or more servers, blades, or other computing devices. As will be apparent, various components of cloud environment may be combined within a single physical device or may be disposed among multiple physical devices. For example, cloud controller 130 and topology manager 140 may be disposed within a single device, while scaling controller 120 may be disposed among two or more physical devices. Such multiple physical devices may be geographically distributed and in communication via a network such as the Internet. Exemplary cloud environment may include a plurality of server instances 102, 104, 106, instantaneous server dynamics blackboard 110, scaling controller 120, smoothed server dynamics database 125, cloud controller 130, and topology manager 140.

Server instances 102, 104, 106 may each include hardware or executable instructions on a machine-readable storage medium configured to perform various functions in connection with a cloud application. For example, each server instance 102, 104, 106 may include a virtual machine execution on cloud hardware and managed by a hypervisor. Further, each server instance 102, 104, 106 may be provided with application code related to the cloud application. For example, server instance S1 102 and server instance S2 104 may each provide a shopping website front-end while server instance Sn 106 may provide a shopping cart backend. Various alternative cloud application and server instance application code will be apparent. It will also be apparent that cloud environment may include any number of server instances and may support any number of cloud applications. Further, the number of cloud instances may vary during run time as new server instances are spawned and existing server instances are terminated.

During operation, each server instance 102, 104, 106 may monitor various metrics for the server instance's own performance. For example, each server instance 102, 104, 106 may monitor a request service rate and queue height, among other metrics. From time to time, the server instance 102, 104, 106 may report these instantaneous server dynamics to the instantaneous server dynamics blackboard 110 for further processing based on various triggers. For example, the server instances 102, 104, 106 may report at regular time intervals, may report after processing a predetermined number of requests, may report whenever an associated CPU is idle, or may report in response to request from an external element for such a report.

Instantaneous server dynamics blackboard 110 may be a device that stores instantaneous server dynamics reported by various server instances 102, 104, 106 and provides such instantaneous server dynamics to scaling controller 120. Thus, instantaneous server dynamics blackboard 110 may include a machine-readable storage medium such as read-only memory (ROM), random-access memory (RAM), magnetic disk storage media, optical storage media, flash-memory devices, or similar storage media. From time to time, instantaneous server dynamics blackboard 110 may transmit any stored instantaneous server dynamics to scaling controller 120. For example, instantaneous server dynamics blackboard 110 may transmit instantaneous server dynamics at regular intervals of time or upon request from scaling controller 120. After transmitting the stored instantaneous server dynamics, instantaneous server dynamics blackboard 110 may delete the transmitted instantaneous server dynamics from memory. Exemplary contents and organization of instantaneous server dynamics blackboard 110 will be described in greater detail below with respect to FIG. 3.

Scaling controller 120 may include hardware or executable instructions on a machine-readable storage medium configured to analyze various server dynamics and make decisions regarding application scaling. As will be described in greater detail below with respect to FIG. 2, scaling controller 120 may receive instantaneous server dynamics from instantaneous server dynamics blackboard 110, compute smoothed server dynamics (e.g., mean values), and compare values of the smoothed server dynamics to related thresholds, and subsequently determine whether the application should be scaled up or down. Upon making a scaling determination, scaling controller 120 may instruct cloud controller 130 to take various actions to effect the scaling and may report any changes in server topology to topology manager 140. Scaling controller 120 may also store the computed smoothed server dynamics in smoothed server dynamics database 125 for future use.

Smoothed server dynamics database 125 may be a device that stores smoothed server dynamics such as, for example, smooth service rates and smoothed queue heights for the various server instances 102, 104, 106. Smoothed server dynamics database 125 may also store various metadata associated with cloud applications. Thus, smoothed server dynamics database 125 may include a machine-readable storage medium such as read-only memory (ROM), random-access memory (RAM), magnetic disk storage media, optical storage media, flash-memory devices, or similar storage media. Exemplary contents and arrangement of smoothed server dynamics database 125 will be described in greater detailed below with respect to FIGS. 4-5.

Cloud controller 130 may include hardware or executable instructions on a machine-readable storage medium configured to control the allocation of resources within the cloud. For example, cloud controller may allocate resources to server instances 102, 104, 106, establish additional server instances (not shown), terminate server instances, or redistribute work load among server instances. Cloud controller 130 may include or cooperate with various other components (not shown) such as a load balancer or one or more hypervisors. Cloud controller 130 may perform various scaling actions at the instruction of other components such as scaling controller 120. Upon effecting a change to the cloud, cloud controller 130 may report a change in topology back to scaling controller 120.

Topology manager 140 may include hardware or executable instructions on a machine-readable storage medium configured to maintain endpoint information for the server instances 102, 104, 106. Topology manager 140 may also maintain additional information such as flow latency information, resource characteristics, and snapshots of resource availability. Upon receiving an indication of a change in topology, such as the addition or termination of a server instance, topology manager may communicate with server instances 102, 104, 106, to handle this change. For example, topology manager may transmit to each server instance 102, 104, 106 information about "neighbor" server instances.

Figure 2:
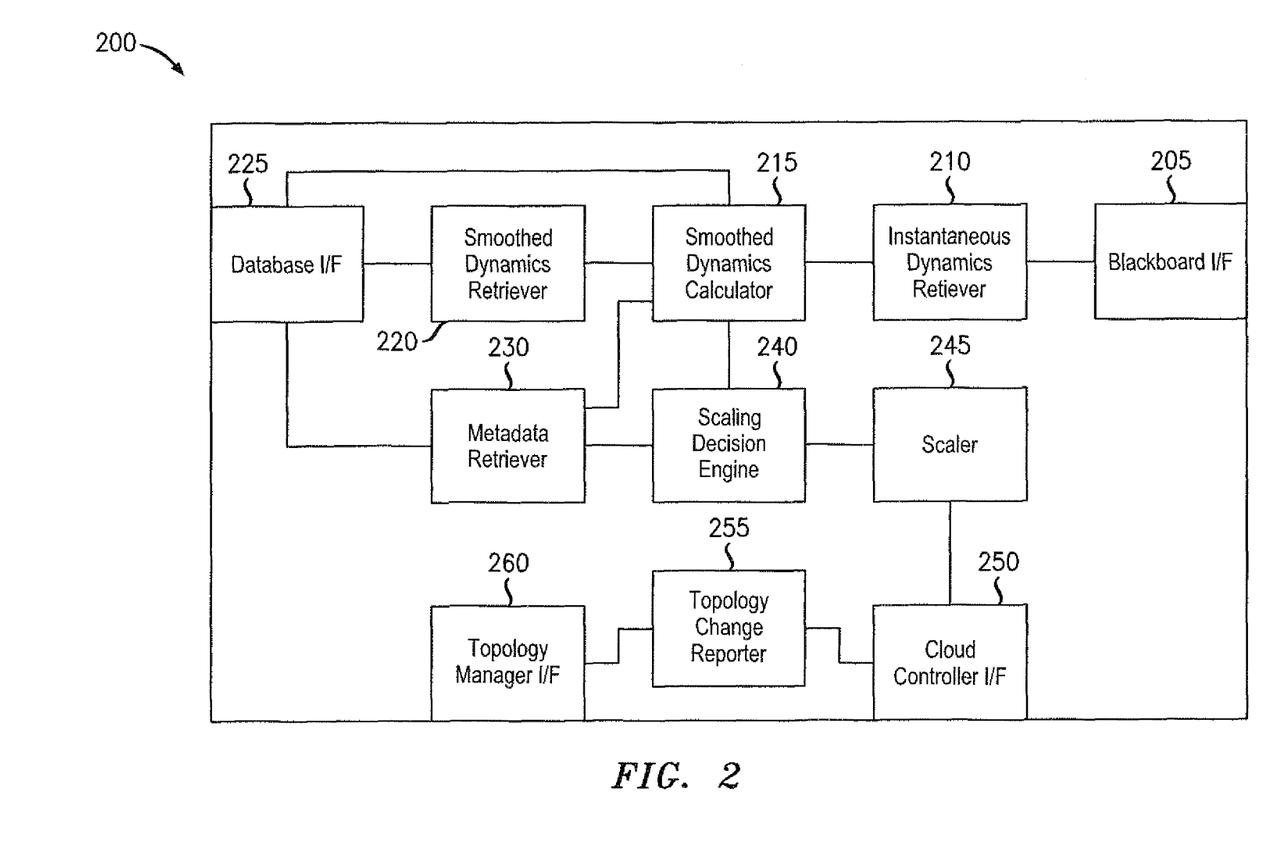
FIG. 2 illustrates an exemplary scaling controller for providing dynamic scaling.

FIG. 2 illustrates an exemplary scaling controller 200 for providing dynamic scaling. Scaling controller 200 may correspond to scaling controller 120 of exemplary cloud environment 100. It will be apparent that scaling controller 200, as illustrated, may be an abstraction. Various components may be realized by hardware or machine-executable instructions. Further, various components may share hardware resources. For example, the various components may share a single processor of scaling controller 200. Scaling controller 200 may include blackboard interface 205, instantaneous dynamics retriever 210, smoothed dynamics calculator 215, smoothed dynamics retriever 220, database interface 225, metadata retriever 230, scaling decision engine 240, scaler 245, cloud controller interface 250, topology change reporter 255, and topology manager interface 260.

Blackboard interface 205 may be an interface including hardware or executable instructions encoded on a machine-readable storage medium configured to communicate with at least one other network device, such as instantaneous server dynamics blackboard 110 of exemplary cloud environment 100. Blackboard interface 205 may include one or more physical ports and may communicate according to one or more protocols such as TCP, IP, or Ethernet. In various embodiments wherein scaling controller 200 includes an instantaneous server dynamics blackboard (not shown), blackboard interface 205 may include an internal system interface such as an ATA or SCSI device, or an operating system inter-process communication functionality.

Instantaneous dynamics retriever 210 may include hardware or executable instructions on a machine-readable storage medium configured to communicate via blackboard interface 205 to retrieve instantaneous dynamics reported by various server instances. For example, instantaneous dynamics retriever 210 may send a request for instantaneous dynamics and receive the requested information in response. Instantaneous dynamics retriever 210 may then pass the new instantaneous dynamics to smoothed dynamics calculator 215.

Smoothed dynamics calculator 215 may include hardware or executable instructions on a machine-readable storage medium configured to calculate smoothed dynamics based on retrieved instantaneous dynamics. For example, smoothed dynamics calculator 215 may calculate a mean of each of the values of the server dynamics based on a sliding window. As another example, smoothed dynamics calculator 215 may receive a previous smoothed dynamics value from smoothed dynamics retriever, multiply this value by a decay factor, and add the resulting value to the instantaneous value. After calculating the smoothed dynamics, smoothed dynamics calculator 215 may pass this data to scaling decision engine 240. Smoothed dynamics calculator 215 may also store the newly computed smoothed dynamics in a database via database interface 225. In various embodiments, that smoothed dynamics calculator may additionally normalize the smoothed values based on a window length as determined by the decay factor. For example, the window length may be equal to the inverse of one minus the decay factor.

Smoothed dynamics retriever 220 may include hardware or executable instructions on a machine-readable storage medium configured to, upon request by the smoothed dynamics calculator 215, retrieve previously-calculated smoothed dynamics for a server instance. Smoothed dynamics retriever 220 may generate and transmit a request for a smoothed dynamics record via database interface 225. After receiving the record in response, smoothed dynamics retriever 220 may then pass the previous smoothed dynamics to smoothed dynamics calculator.

Database interface 225 may be an interface including hardware or executable instructions encoded on a machine-readable storage medium configured to communicate with at least one other network device, such as smoothed server dynamics database 125 of exemplary cloud environment 100. Database interface 225 may include one or more physical ports and may communicate according to one or more protocols such as TCP, IP, or Ethernet. In various embodiments wherein scaling controller 200 includes a smoothed server dynamics database (not shown), database interface 225 may include an internal system interface such as an ATA or SCSI device, or an operating system inter-process communication functionality. In various embodiments, database interface 225 may share at least some components with blackboard interface 205.

Metadata retriever 230 may include hardware or executable instructions on a machine-readable storage medium configured to retrieve a metadata record for use by smoothed dynamics calculator 215 or scaling decision engine. Such a metadata record may include information such as a decay factor or various threshold values. In various embodiments, each metadata record may be associated with a particular application or server type. In some such embodiments, to locate an appropriate metadata record for a server instance, the metadata retriever 230 may include or have access of a mapping of various server instances to associated server types. After retrieving the metadata record, metadata retriever may pass the appropriate metadata values to smoothed dynamics calculator 215 or scaling decision engine.

Scaling decision engine 240 may include hardware or executable instructions on a machine-readable storage medium configured to determine, based on smoothed dynamics passed in by smoothed dynamics calculator, whether an application should be scaled down, scaled up, or left alone for the time being. In doing so, scaling decision engine 240 may compare values of the smoothed dynamics to associated threshold values. In doing so, the scaling decision engine may determine whether the present server instance is undersaturated, saturated, or oversaturated. For example, if a smoothed service rate is higher than an upper service rate threshold and a smoothed queue height is lower than a lower queue height threshold, scaling decision engine may determine that the server instance does not have enough work and that the application should be scaled down. Additional examples will be described with respect to FIG. 6. After making a scaling decision, scaling decision engine may pass the decision to scaler 245.

Scaler 245 may include hardware or executable instructions on a machine-readable storage medium configured to effect changes in the cloud consistent with a scaling decision from scaling decision engine 240. As such, scaler 245 may generate and transmit instructions for a cloud controller via cloud controller interface 250. For example, upon receiving an instruction to scale an application down, scaler 245 may transmit an instruction to terminate one or more server instances. Scaler 245 may also instruct a cloud controller to combine the work load from the terminated server instance that of one or more of the remaining server instances. As another example, upon receiving an instruction to scale an application up, scaler 245 may transmit an instruction to redistribute work away from the present server instance, allocate additional resources to the server instance, or spawn an additional server instance to handle some of the load of the present server instance. If the scaler 245 instructs the cloud controller to spawn additional server instances, scaler 245 may also instruct the cloud controller to spawn these new instances on cloud hardware that is different from the hardware associated with the present server instance. In this way, the scaling controller may ensure that localized anomalies, such as runaway programs, do not also adversely affect the new server instance.

Cloud controller interface 250 may be an interface including hardware or executable instructions encoded on a machine-readable storage medium configured to communicate with at least one other network device, such as cloud controller 130 of exemplary cloud environment 100. Cloud controller interface 250 may include one or more physical ports and may communicate according to one or more protocols such as TCP, IP, or Ethernet. In various embodiments wherein scaling controller 200 includes a cloud controller (not shown), database interface 225 may include an internal system interface such as an ATA or SCSI device, or an operating system inter-process communication functionality. In various embodiments, cloud controller interface 225 may share at least some components with blackboard interface 205 or database interface 225.

Topology change reporter 255 may include hardware or executable instructions on a machine-readable storage medium configured to forward information relating to a change in cloud topology to a topology manager, such as topology manager 140. For example, in response to a scaling instruction transmitted by scaler 245, topology change reporter 255 may receive, via cloud controller interface 250, an indication that one or more server instances have been added or terminated. Topology change reporter 255 may then forward this information via topology manager interface 260.

Topology manager interface 260 may be an interface including hardware or executable instructions encoded on a machine-readable storage medium configured to communicate with at least one other network device, such as topology manager 140 of exemplary cloud environment 100. Topology manager interface 250 may include one or more physical ports and may communicate according to one or more protocols such as TCP, IP, or Ethernet. In various embodiments wherein scaling controller 200 includes a topology manager (not shown), database interface 225 may include an internal system interface such as an ATA or SCSI device, or an operating system inter-process communication functionality. In various embodiments, topology manager interface 225 may share at least some components with blackboard interface 205, database interface 225, or cloud controller interface.

Figure 3:
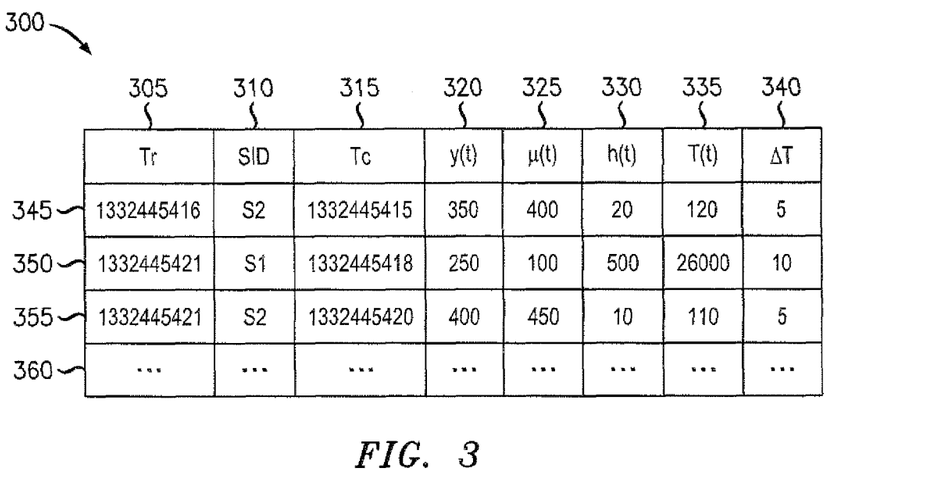
FIG. 3 illustrates an exemplary data arrangement for storing instantaneous server dynamics.

FIG. 3 illustrates an exemplary data arrangement 300 for storing instantaneous server dynamics. Data arrangement 300 may be implemented using a variety of data structures such as, for example, objects, arrays, linked lists, trees, or hash tables. Data arrangement 300 may be stored in, for example, instantaneous server dynamics blackboard 110 of exemplary cloud environment 100. Data arrangement 300 may include a number of fields such as received timestamp field 305, server instance ID field 310, computed timestamp field 315, congestion field 320, service rate field 325, queue height field 330, processing latency field 335, and time window field 340. It will be apparent that various alternative or additional values may be stored as instantaneous server dynamics in data arrangement 300.

Received timestamp field 305 may indicate a time when the record was received for storage. Server instance ID field 310 may indicate an ID value for a server instance with which a record is associated. Computed timestamp field 315 may indicate a time at which a server instance computed the instantaneous server dynamics held by a record. Congestion field 320 may indicate a measure of the current congestion at the associated server instance. For example, this value may indicate the number of requests that arrived over the time window. Service rate field 325 may store a measure of how many requests were processed. For example, this value may indicate the number of requests processed during the time window.

Queue height field 330 may store an indication of the current length of the input queue for the server instance. In various embodiments, this may simply include a count of the number of requests awaiting processing. In other embodiments, this may include the number of requests normalized based on the relative complexities of the tasks awaiting processing. For example, a relatively complex request may count as two units toward the queue height while a relatively simple task may count as only a half of a unit. Various modifications will be apparent.

Processing latency field 335 may store a value indicating how quickly the requests were processed on average over the time window. For example, this value may indicate an average holding time for the requests. Time window field 340 may store an indication of the length of the time window used to calculate the instantaneous server dynamics stored in the record.

As an example, record 345 may have been received from server instance "S2" at time "1332445416." Record 345 may indicate that, at time "1332445415," and over a time window of 5 seconds, the server instance calculated the congestion to be 350, the service rate to be 400, the height of the input queue to be 20, and the processing latency to be 120. The meanings of exemplary records 350 and 355 will also be readily apparent. Data arrangement 300 may include numerous additional records 360.

Figure 4:
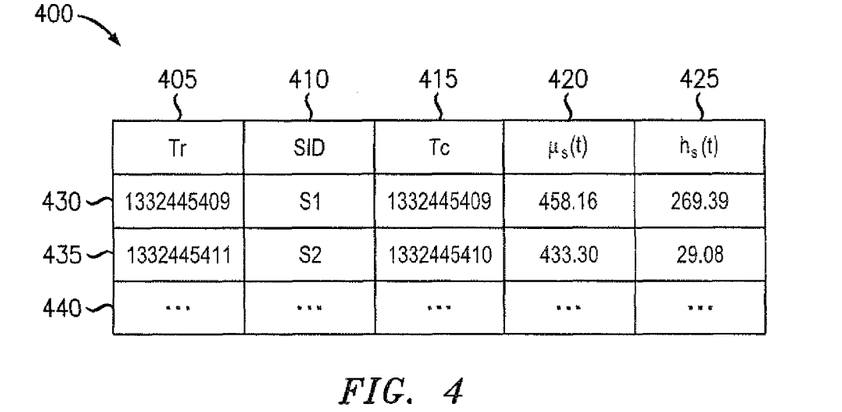
FIG. 4 illustrates an exemplary data arrangement for storing smoothed server dynamics.

FIG. 4 illustrates an exemplary data arrangement 400 for storing smoothed server dynamics. Data arrangement 400 may be implemented using a variety of data structures such as, for example, objects, arrays, linked lists, trees, or hash tables. Data arrangement 400 may be stored in, for example, smoothed server dynamics database 125 of exemplary cloud environment 100. Data arrangement 400 may include a number of fields such as received timestamp field 405, server instance ID field 410, computed timestamp field 415, smoothed service rate field 420, and smoothed queue height field 425. It will be apparent that various alternative or additional values may be stored as instantaneous server dynamics in data arrangement 400.

Received timestamp field 405 may indicate a time when the record was received for storage. Server instance ID field 410 may indicate an ID value for a server instance with which a record is associated. Computed timestamp field 415 may indicate a time at which a scaling controller computed the smoothed server dynamics held by a record. Smoothed service rate field 420 may store a previously-computed smoothed value for the service rate based on previously received values for instantaneous service rates for the server instance. Smoothed queue height field 425 may store a previously-computed smoothed value for the queue height based on previously received values for instantaneous queue heights for the server instance.

As an example, record 430 may have been received at time "1332445409" and computed at time "1332445409." Record 430 may indicate that, for server instance "S1," the smoothed service rate is "458.16" and the smoothed queue height is "269.39." The meaning of exemplary record 435 will also be readily apparent. Data arrangement 400 may include numerous additional records 440.

Figure 5:
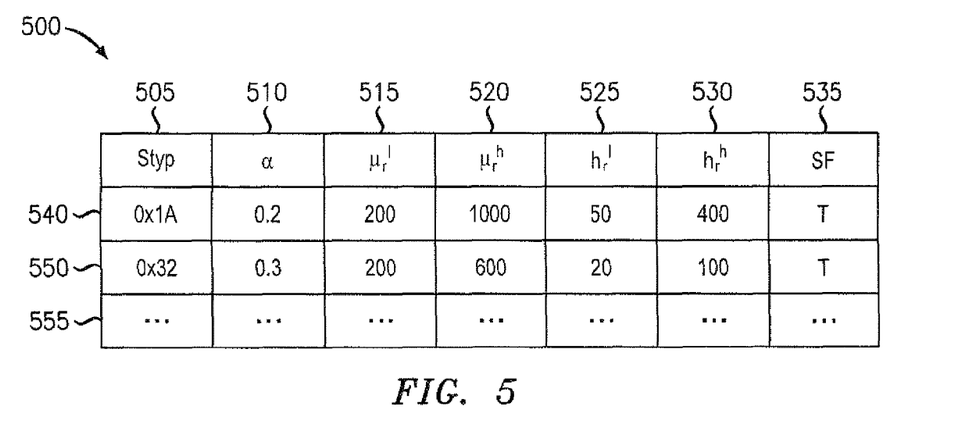
FIG. 5 illustrates an exemplary data arrangement for storing application metadata.

FIG. 5 illustrates an exemplary data arrangement 500 for storing application metadata. Data arrangement 500 may be implemented using a variety of data structures such as, for example, objects, arrays, linked lists, trees, or hash tables. Data arrangement 500 may be stored in, for example, smoothed server dynamics database 125 of exemplary cloud environment 100. Data arrangement 500 may include a number of fields such as server type field 505, decay factor field 510, service rate low threshold field 515, service rate high threshold field 520, queue height low threshold field 525, queue height high threshold field 530, and scaling flag field 535.

Server type field 505 may store an indication as to the type of server with which a record is associated. In various embodiments, this value may specify a particular application or component of an application. For example, one server type might be associated with a particular e-commerce website front-end, while another server type may be associated with a PC game server. Decay factor field 510 may store a decay factor to be used in computing smoothed server dynamics. Service rate low threshold field 515 and service rate high threshold field 520 may both store thresholds related to service rate and useful in determining a current operating mode, as will be described in greater detail below. Queue height low threshold field 525 and queue height high threshold field 530 may store thresholds related to queue height and useful in determining a current operating mode, as will be described in greater detail below. The various thresholds stored in data arrangement 500 may be preconfigured by a cloud administrator or application developer. Further, such threshold values may be obtained through testing in a lab environment by monitoring performance metrics in various ideal and non-ideal cases. Scaling flag field 535 may store an indication as to whether scaling is permitted for a particular server type.

As an example, record 540 may indicate that, for a server type of "0x1A," scaling is permitted and a decay factor of 0.2 should be used. Further, two thresholds for service rate may be set at "200" and "1000," and two thresholds for queue height may be set at "50" and "400." The meaning of exemplary record 545 will also be readily apparent. Data arrangement 500 may include numerous additional records 550.

Figure 6:
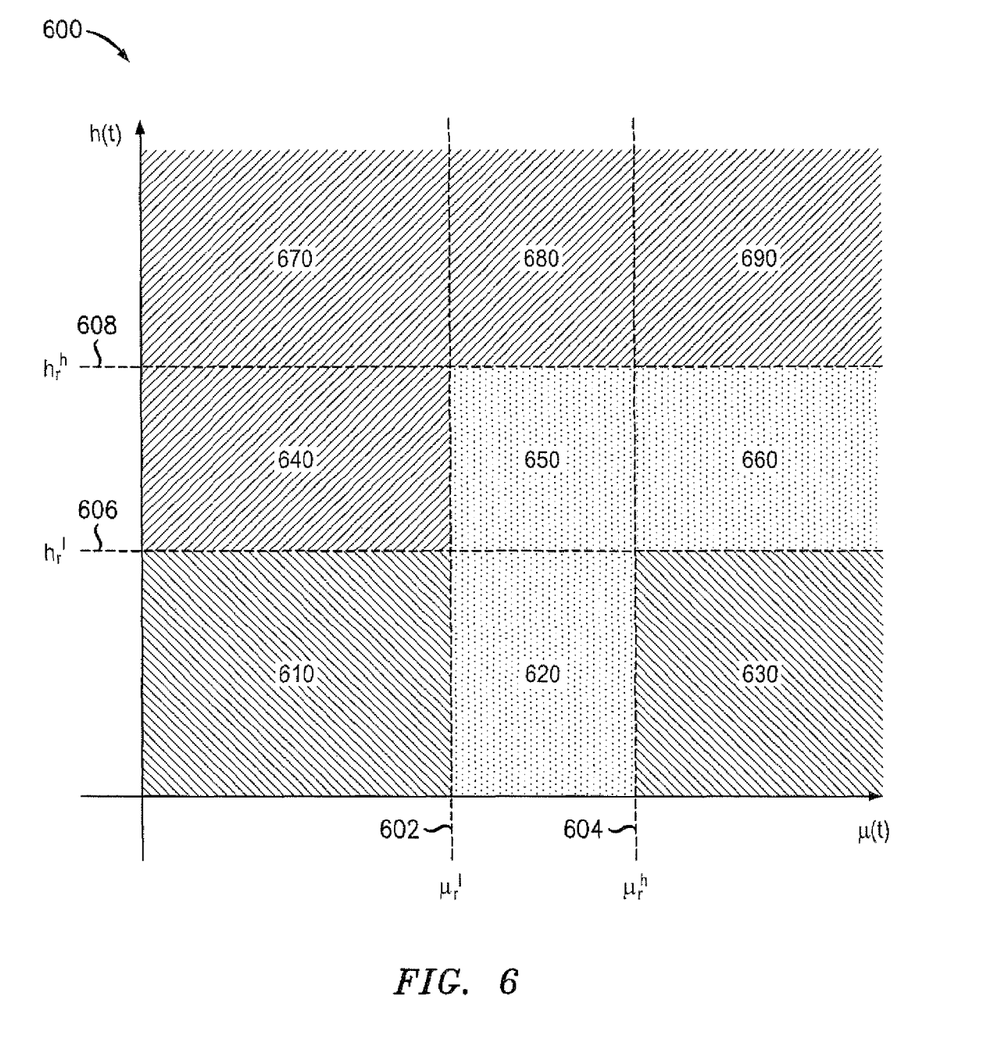
FIG. 6 is a graph illustrating exemplary server dynamics thresholds and operating regions.

FIG. 6 is a graph 600 illustrating exemplary server dynamics thresholds and operating regions. Graph 600 may be indicative of exemplary effects of the aforementioned thresholds along with hard coding, user definable rules, or other methods of correlating a scaling action to measured values and thresholds. Graph 600 may include an x-axis related to service rate and a y-axis related to queue height. Graph 600 may also include threshold lines 602, 604, 606, 608 indicative of the service rate low threshold, service rate high threshold, queue height low threshold, and queue height high threshold, respectively. Together, the threshold lines 602, 604, 606, 608 may divide graph 600 into nine operating regions 610, 620, 630, 640, 650, 660, 670, 680, 690. Each region may be associated with an operating mode such as undersaturated, saturated, or oversaturated. Each operating mode, in turn, may be associated with a particular scaling instruction. As illustrated, regions 610 and 630 may be associated with the undersaturated operating mode; regions 620, 650, and 660 may be associated with the saturated operating mode; and regions 640, 670, 680, and 690 may be associated with the oversaturated mode. It will be apparent that various implementations may have a different distribution of operating modes over the regions; a different number of regions, thresholds, or variables; or different relative values for the thresholds.

For example, if a set of smoothed server dynamics for a server instance included a service rate between thresholds 602 and 604 and a queue height less than threshold 606, the server instance may fall in region 620 and, as such, may be deemed to be operating in the saturated mode. Consequently, a scaling server may determine that no scaling actions need be performed. As another example, if a set of smoothed server dynamics for a server instance included a service rate below threshold 602 and a queue height above threshold 608, the server instance may fall within region 670 and may be deemed to be operating in the oversaturated mode. This particular region may indicate, for example, that the hardware supporting the server instance may be experiencing faults or supporting a runaway program. Consequently, a scaling controller may determine that the application associated with the server instance should be scaled up. Various additional details for realizing the described functionality will be apparent.

Figure 7:
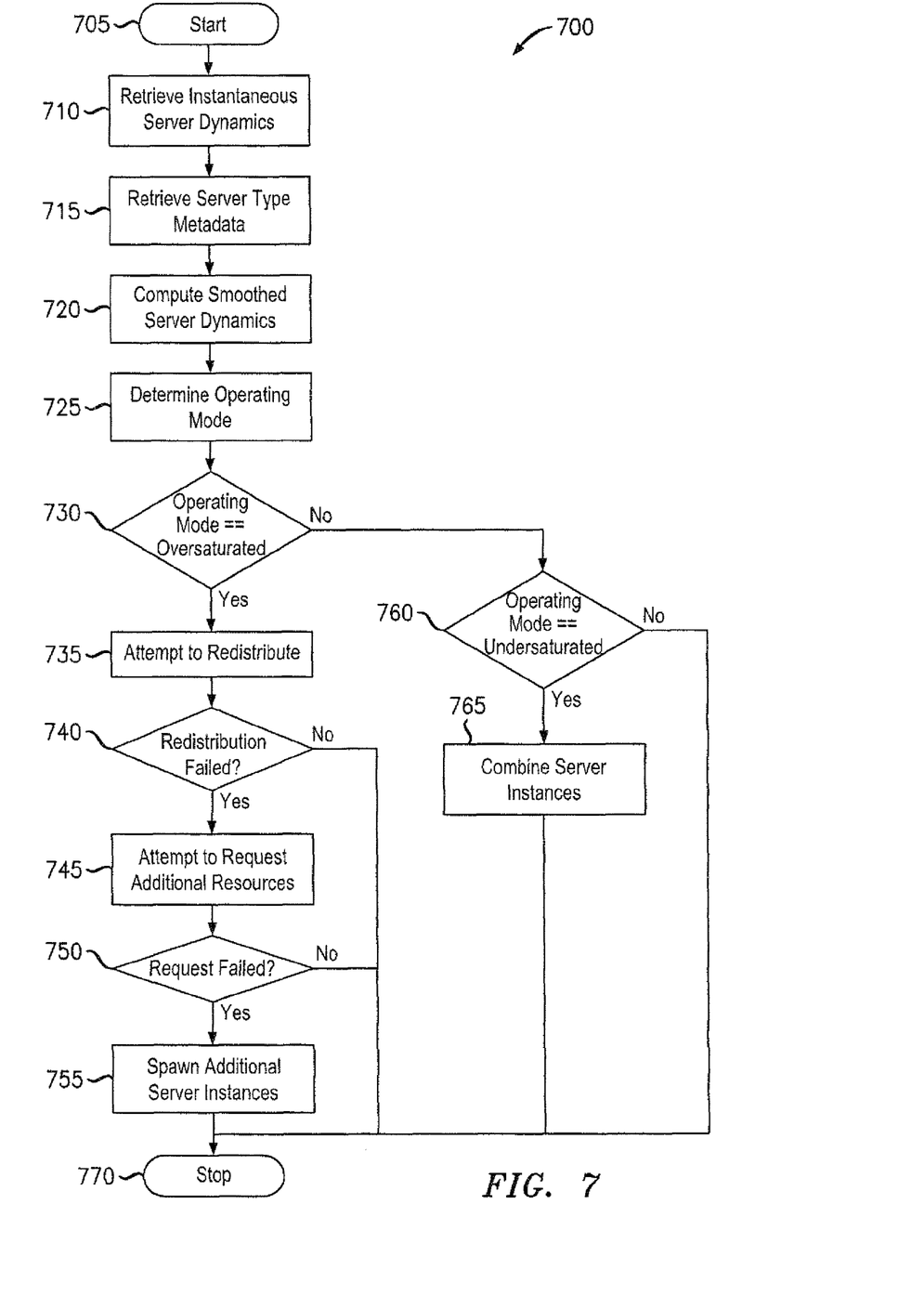
FIG. 7 illustrates an exemplary method for providing dynamic scaling.

FIG. 7 illustrates an exemplary method 700 for providing dynamic scaling. Method 700 may be performed by the components of a scaling controller such as, for example, scaling controller 120 or scaling controller 200. Method 700 may be performed among instantaneous dynamics retriever 210, smoothed dynamics calculator 215, smoothed dynamics retriever 220, metadata retriever 230, scaling decision engine 240, and scaler 245.

Method 700 may begin in step 705 and proceed to step 710 where the scaling controller may retrieve instantaneous server dynamics. For example, the scaling controller may send a request for such instantaneous dynamics to an instantaneous server dynamics blackboard. After receiving the requested data, method 700 may proceed to step 715 where the scaling controller may retrieve metadata such as a decay factor or a number of dynamics thresholds. This metadata may be correlated to a particular server type that corresponds to the server instance for which the instantaneous server dynamics were just received. Then, in step 720, the scaling controller may compute smoothed server dynamics. In various embodiments, this may involve modifying a previously computed smoothed server dynamic value based on a value of the instantaneous server dynamics or a decay factor. Next, in step 725, the scaling controller may determine a current operating mode for the present server instance. For example, by comparing one or more values of the smoothed server dynamics to various thresholds, the scaling controller may determine that the server instance is undersaturated, saturated, or oversaturated.

In step 730, the scaling controller may determine whether the determined operating mode is oversaturated, if so, the scaling controller may attempt to scale up by proceeding to step 735. In step 735, the scaling controller may attempt to redistribute a number of requests from the present server instance to other available server instances. This may include sending an instruction to a cloud controller. In step 740, the scaling controller may determine whether the attempt has failed such as, for example, if the other server instances do not have sufficient capacity to handle the redistributed work. If the attempt was successful, method 700 may proceed to step 770. Otherwise, method 700 may proceed to step 745.

In step 745, the scaling controller may attempt to request additional resources for the present server instance. This may include sending an instruction to a cloud controller. In step 750, the scaling controller may determine whether the attempt has failed such as, for example, if the hardware supporting the server instance does not include free resources sufficient to meet the request. If the attempt was successful, method 700 may proceed to step 770. Otherwise, method 700 may proceed to step 755. In step 755, the scaling controller may send an instruction to the cloud controller to spawn at least one additional server instance and redistribute some of the present server instance's work to the new server instances. Method 700 may then proceed to end in step 700. This instruction may specify that the new server instance should be spawned on hardware that does not already support the present server instance, so as to minimize the effects of localized anomalies.

If on the other hand, the server instance is not currently oversaturated, method 700 may proceed from step 700 to step 760, where the scaling controller may determine whether the operating mode is undersaturated instead. If the operating mode is not undersaturated, method 700 may proceed to end in step 770. Otherwise, method 700 may proceed to step 765 where the scaling controller may instruct a cloud controller to combine two or more server instances. For example, the scaling controller may instruct the cloud controller to terminate the present server instance and redistribute the present server instance's work load among any remaining server instances. Method 700 may then proceed to end in step 770.

Having described various exemplary systems, components, and methods, an example of the operation of exemplary cloud environment 100 will now be presented. For the purposes of example, scaling controller 200 may correspond to scaling controller 120; data arrangement 300 may describe the contents of instantaneous server dynamics blackboard 110, data arrangements 400 and 500 may describe the contents of smoothed server dynamics database 125, and graph 600 and method 700 may describe the operation of scaling controller 120, 200.

The process may begin in step 705 and proceed to step 710 where instantaneous dynamics retriever 210 may request and receive records 245, 350, 355, 360 from instantaneous server dynamics blackboard 110. Instantaneous server dynamics blackboard 110 may then clear these records from memory. Beginning with server instance S2 104, which may be associated with the first record 345, in step 715, metadata retriever 230 may retrieve metadata record 550 as corresponding to the application type of server instance S2 104. It will be apparent that method 700 may process dynamics associated with multiple server instances for example, iteratively or in parallel. Next, in step 720, the smoothed dynamics retriever may retrieve record 435 and proceed to compute the new smoothed dynamics. After application of the instantaneous dynamics reported in record 345, the new smoothed service rate may be 529.99 (433.30*0.3+400) and the new smoothed queue height may be 28.72 (29.08*0.3+20). Because record 355 also relates to server instance S2 104, smoothed dynamics calculator 215 may then go on to process this record 355 as well. Thus, after application of the instantaneous dynamics reported in records 345 and 355, the new smoothed service rate may be 609.00 (529.99*0.3+450) and new smoothed queue height may be 18.62 (28.72*0.3+10). Scaling controller 120, 200 may write these values in an updated record 435 to data arrangement 400. In step 725, scaling decision engine 240 may determine that because the smoothed service rate is above the service rate high threshold stored in record 550 (609.00>600) and the smoothed queue height is below the queue height low threshold store in record 550 (18.62<20), server instance S2 104 may be operating in region 630 and therefore may be undersaturated. Method 700 may then proceed to step 765 where scaler 245 may transmit an instruction to cloud controller 130 to terminate server instance S2 104 or to simply "scale down." Topology change reported 255 may then receive an indication from cloud controller 130 that server instance S2 104 has been terminated and may report this change to topology manager 140. Topology manager may, in turn, communicate new endpoint information to remaining server instances 102, 106.

In a similar manner, scaling controller 120, 200 may determine that server S1 102 is currently oversaturated and should be scaled up. In particular, the scaling controller 120, 200 may compute a new smoothed service rate of 191.63 and a new smoothed queue height of 553.88, may determine that these values correspond to operating region 670, and may determine that the server instance S1 102 should be scaled up. For example, scaling controller 120, 200 may instruct cloud controller 130 to spawn a new instance of server instance S1 102 to handle the increased load.

According to the foregoing, various embodiments enable for dynamic scaling of server instances in a cloud environment. In particular, by monitoring various indications of the performance of server instances, a scaling controller may make effective decisions as to when an application should be scaled up or down.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a cloud application scaling controller for providing dynamic scaling, the method comprising:

determining, by the cloud application scaling controller, first server dynamics associated with a first server instance, wherein the first server dynamics are indicative of a current performance of the first server instance, wherein the first server dynamics comprise a first arriving requests metric and a first processed requests metric;

determining, by the cloud application scaling controller, second server dynamics associated with a second server instance, wherein the second server dynamics are indicative of a current performance of the second server instance, wherein the second server dynamics comprise a second arriving requests metric and a second processed requests metric;

determining, based on the first arriving requests metric and the first processed requests metric, a current operating mode of the first server instance;

determining, based on the second arriving requests metric and the second processed requests metric, a current operating mode of the second server instance;

scaling up with respect to the first server instance based on the first current operating mode indicating that the server instance is oversaturated; and scaling down with respect to the second server instance based on the second current operating mode indicating that the server instance is undersaturated.

2. The method of claim 1, wherein the first processed requests metric comprises at least one value for a service rate and the first arriving requests metric comprises at least one value for an input queue height.

3. The method of claim 1, wherein, the step of determining first server dynamics comprises:
receiving instantaneous server dynamics reported by the first server instance, and
computing smoothed server dynamics based on the instantaneous server dynamics; and
the step of determining, based on the first server dynamics, a current operating mode comprises:
determining, based on the smoothed server dynamics, a current operating mode of the first server instance.

4. The method of claim 3, wherein the step of computing smoothed server dynamics comprises:

retrieving a previous smoothed server dynamics value;
multiplying the previous smoothed server dynamics value by a decay factor to produce a decayed server dynamics value; and
adding an instantaneous server dynamics value of the instantaneous server dynamics to the decayed server dynamics value to produce a smoothed server dynamics value.

5. The method of claim 1, wherein the step of determining a current operating mode of the first server instance comprises:

comparing at least one value of the first server dynamics to at least one threshold value associated with the at least one value;
determining, based on the comparison, whether the current operating mode of the first server instance is undersaturated, saturated, or oversaturated.

6. The method of claim 1, wherein the step of scaling up comprises sending a scaling instruction to spawn at least one new server instance.

7. The method of claim 1, wherein the step of scaling down comprises sending a scaling instruction to combine at least two server instances into a single server instance.

8. A cloud application scaling controller for providing dynamic scaling, the cloud application scaling controller comprising:

a blackboard interface configured to communicate with an instantaneous server dynamics blackboard;

a cloud controller interface configured to communicate with a cloud controller;

an instantaneous dynamics retriever configured to retrieve an instantaneous dynamics value via the blackboard interface;

a smoothed dynamics calculator configured to compute a smoothed dynamics value based on combining the instantaneous dynamics value with a previous smoothed dynamics value;

a scaling decision engine configured to determine, based on the smoothed dynamics value, whether an server instance associated with the smoothed dynamics value should be scaled up or scaled down; and a scaler configured to transmit a scaling instruction via the cloud controller interface based on the determination of the scaling decision engine.

9. The cloud application scaling controller of claim 8 wherein the instantaneous dynamics value includes at least one of a service rate and an input queue height.

10. The cloud application scaling controller of claim 9, wherein the input queue height is a value derived by normalizing an input queue length based on complexities of requests stored in the input queue.

11. The cloud application scaling controller of claim 8 further comprising:

a database interface configured to communicate with at least one database;

a smoothed dynamics retriever configured to retrieve the previous smoothed dynamics value; and a metadata retriever configured to retrieve a decay factor, wherein, in computing the smoothed dynamics value, the smoothed dynamics calculator is configured to compute the smoothed dynamics value based on the instantaneous dynamics value, the previous smoothed dynamics value, and the decay factor.

12. The cloud application scaling controller of claim 11, wherein, the metadata retriever is further configured to retrieve at least one threshold value, and in determining whether a server instance should be scaled up or scaled down, the scaling decision engine is configured to compare the scaled dynamics value to the at least one threshold value.

13. The cloud application scaling controller of claim 11, wherein the metadata retriever is further configured to determine a server type associated with the server instance, and in retrieving the decay factor, the metadata retriever is configured to retrieve a decay factor associated with the server type.

14. The cloud application scaling controller of claim 8, wherein the scaling instruction includes at least one of the following:

an instruction to redistribute work load among a plurality of server instances;

an instruction to request additional resources at least one server instance;

an instruction to spawn at least one new server instance; and an instruction to terminate at least one server instance.

15. The cloud application scaling controller of claim 8, further comprising:

a topology manager interface configured to communicate with a topology manager; and a topology change reporter configured to receive, via the cloud controller interface, an indication of a change in cloud topology, and report the change in cloud topology via the topology manager interface.

16. An apparatus for providing dynamic scaling, the apparatus comprising:

a memory; and a processor communicatively coupled to the memory, the processor being configured to:

determine by a cloud application scaling controller, first server dynamics associated with a first server instance, wherein the first server dynamics are indicative of a current performance of the first server instance, wherein the first server dynamics comprise a first arriving requests metric and a first processed requests metric;

determine second server dynamics associated with a second server instance, wherein the second server dynamics are indicative of a current performance of the second server instance, wherein the second server dynamics comprise a second arriving requests metric and a second processed requests metric;

determine, based on the first arriving requests metric and a first processed requests metric, a current operating mode of the first server instance;

determine, based on the second arriving requests metric and a second processed requests metric, a current operating mode of the second server instance;

scale up with respect to the first server instance based on the first current operating mode indicating that the server instance is oversaturated; and scale down with respect to the second server instance based on the second current operating mode indicating that the server instance is undersaturated.

17. The apparatus of claim 16, wherein the first processed requests metric comprises at least one value for a service rate and the first arriving requests metric comprises at least one value for an input queue height.

18. The apparatus of claim 16, wherein, in determining first server dynamic, the processor is configured to:

receive instantaneous server dynamics reported by the server instance, and compute smoothed server dynamics based on the instantaneous server dynamics; and in determining, based on the first server dynamics, a current operating mode for the first server instance, the processor is configured to:

determine, based on the smoothed server dynamics, a current operating mode of the first server instance.

19. The apparatus of claim 18, wherein, in computing smoothed server dynamics, the processor is configured to:

retrieve a previous smoothed server dynamics value;

multiply the previous smoothed server dynamics value by a decay factor to produce a decayed server dynamics value; and add an instantaneous server dynamics value of the instantaneous server dynamics to the decayed server dynamics value to produce a smoothed server dynamics value.

20. The apparatus of claim 16, wherein, in determining a current operating mode for the first server instance, the processor is configured to:

compare at least one value of the server dynamics to at least one threshold value associated with the at least one value;

determine, based on the comparison, whether the current operating mode of the first server instance is undersaturated, saturated, or oversaturated.

* * * * *